SLOW MOTION REPRODUCTION OF TRANSVERSELY RECORDED TELEVISION SIGNALS

Filed Sept. 22, 1964 5 Sheets-Sheet 1

INVENTORS
Keiji Suzuki
Minoru Inatsu
Takashi Iwasawa
BY Stevens, Davis, Miller & Mosher
ATTORNEYS INVENTORS
Keiji Suzuki
Minoru Imatsu
Takashi Iwasawa
BY Stevens, Davis, Miller & Mosher
ATTORNEYS INVENTORS
Keiji Suzuki
Minoru Inatsu
Takashi Iwasawa
BY Stevens, Davis, Miller & Mosher
ATTORNEYS INVENTORS
Keiji Suzuki
Minoru Inatsu
Takashi Iwasawa
BY
Stevens, Davis, Miller & Mosher
ATTORNEYS INVENTORS
Keiji Suzuki
Minoru Inatsu
Takashi Iwasawa
BY
Stevens, Davis, Miller & Mosher
ATTORNEYS

United States Patent Office 3,395,248
Patented July 30, 1968

3,395,248

SLOW MOTION REPRODUCTION OF TRANSVERSELY RECORDED TELEVISION SIGNALS

Keiji Suzuki and Minoru Inatsu, Tokyo, and Takashi Iwasawa, Yokohama, Japan, assignors to Japan Broadcasting Corporation, Chiyoda-ku, Tokyo, Japan, a corporation of Japan Filed Sept. 22, 1964, Ser. No. 398,221
Claims priority, application Japan, Oct. 19, 1963, 38/55,023
9 Claims. (Cl. 178—6.6)

ABSTRACT OF THE DISCLOSURE

A slow motion television signal reproducing system, wherein a tape of a video tape recording system, recorded by four-head recording equipment in multiple recording tracks, is driven at $1/n$th rate of normal speed. The multiple recording tracks of one field signal of the tape are scanned by a reproducing head having exactly the same relative speed with the recording time so that one field television signal recorded in the multiple tracks is divided into $(n-1)$ groups each having $1/(n-1)$ tracks. Each of the $(n-1)$ groups is picked up by a reproducing head, which is particularly designed for this object, so as to produce intermittently $1/(n-1)$ of the tracks in one field. The intermittently reproduced signal is stored in one of a pair of one field memory and reproducing equipment while the other one of the memory equipment reproduces $n$ times of a previously stored signal to thus provide an $n$-field slow motion television signal having exact standard lines and frames.

Figure 1:
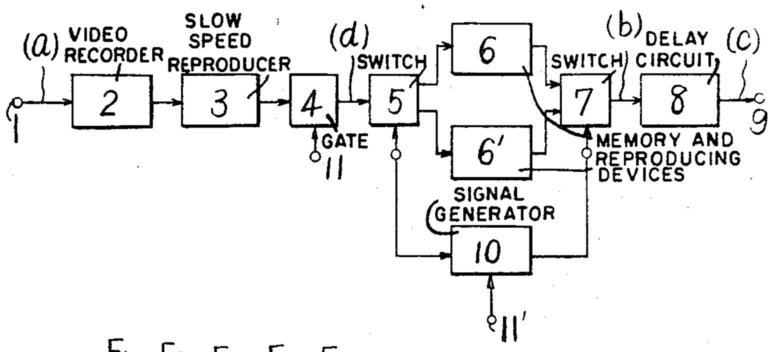
Figure 2A:
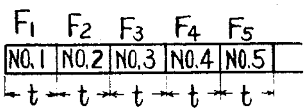
Figure 2B:
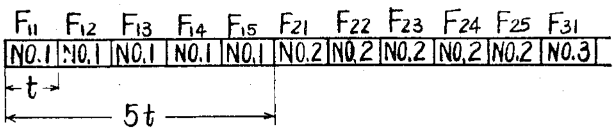
Figure 2C:
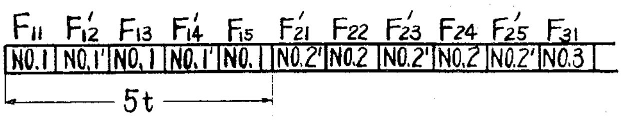
Figure 2D:
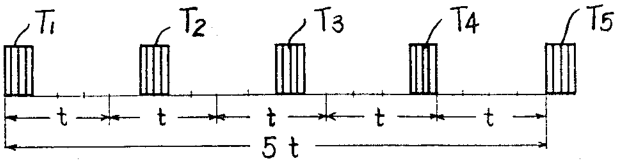
Figure 2E:
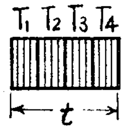

This invention relates to a television signal recording and reproducing system, more particularly to a system of reproducing television signals converted to slow motion or stationary images out of television signals recorded by a video tape recorder.

The slow motion or stationary image television signal has conventionally been produced either by standard speed reproduction of the film with which the objects have been filmed at high speed or by reproduction of the film recorded by Kinescope recording with modification of its number of images in accordance with the television image to be transmitted. Such methods necessitated additional work of development and fixing, and hence they lacked in promptness, besides they had a disadvantageous tendency to decay in the image quality compared with the video tape recorder.

Another conventional method is to record a field of television signals as one or more record tracks disposed aslant with regard to the direction of the tape width by using a video tape recorder having one or more heads and to reproduce it by tracing the same signal tracks repeatedly and thus to obtain the slow motion or stationary image television signal. In this case, however, it needs a number of difficult adjustments such as adjustment of the difference of angle between the reproducing head and record tracks during slow speed reproduction and adjustment of the track length, in addition to the difficulty in improving the accuracy of intermittent forward movement of the tape, and the above methods had not been put into practical use due to such draw-backs.

In addition to the above, there are other methods using wide magnetic sheets or magnetic drums, but it was found difficult to obtain the required mechanical accuracy in those methods.

This invention using a video tape recorder provides a novel system, entirely different from those conventionally proposed heretofore, satisfying the promptness as in television broadcast, especially in sports programs, and obtaining slow motion and stationary images television signal with high quality images.

There is a known video tape recorder having a plurality of heads rotating perpendicularly to the direction of the magnetic tape travel, e.g. 4 heads mounted at uniform intervals on a drum revolving at a high speed of 240 c./s., having the original signal such as frequency modulated television signals applied to the said heads, and recording the original signal with the above heads as a plurality of recording-tracks disposed in the direction of the magnetic tape width, e.g. 16 tracks per field.

The invention is a system for reproducing television signals converted to slow motion or stationary images out of the original signal such as a television signal recorded on the magnetic tape by such method as the above, the recorded magnetic tape being once led to the tape slow speed reproducing equipment making the tape travel speed one $n$th of the recording speed (here, $n$ is a positive integer), one field signal recorded on the magnetic tape by the special reproducing head assembly of the tape slow speed reproducing equipment being intermittently reproduced over the period of $n$ fields, this intermittently reproduced television signal being recorded on one of at least two sets of 1 field memory reproducing device and being reproduced $n$ times repeatedly as a continuous field signal, during the said reproducing period the other 1-field memory reproducing device memorizing the following one field with the output of the said tape slow speed reproducing device, the $n$ times slow motion television signal being obtained by making the said two memory reproducing devices record and reproduce in turn, the stationary image being obtained by ceasing switching of the said at least two sets of memory reproducing devices to reproduce continuously from the one of 1-field memory reproducing devices. Since the said continuous slow motion or stationary image signals attained from the said 1-field memory reproducing devices are formed as the continuous wave signal of the same field signal, if necessary a series of slow motion or stationary image standard television signals can be produced by converting every other field signal to the one similar to interlacing scanned television signals.

Figure 3:
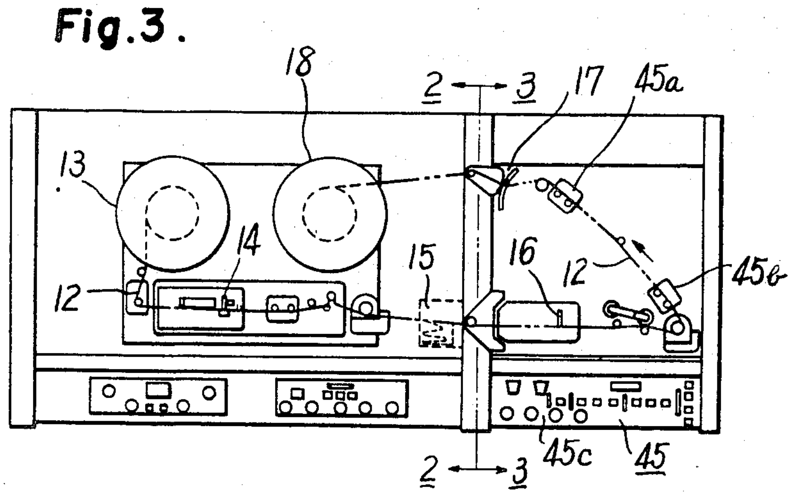
Figure 4:
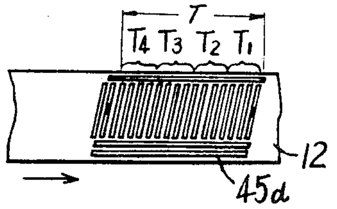

For a better understanding of the invention, reference is made to the accompanying drawings, in which, FIG. 1 is a block diagram illustrating an embodiment of slow motion VTR system according to the invention, FIGS. 2*a* to 2*e* are field sequence diagrams for the standard TV signal and for the signal at each part of a slow motion system embodying the invention, FIG. 3 is a recording and reproducing device equipped with the tape slow speed reproducing device embodying the invention which reproduces one field television signal intermittently by moving the tape at a slow speed, FIG. 4 is a partial plan view illustrating the standard TV signal of one field recorded on magnetic tape by conventional multiheads.

Figure 5:
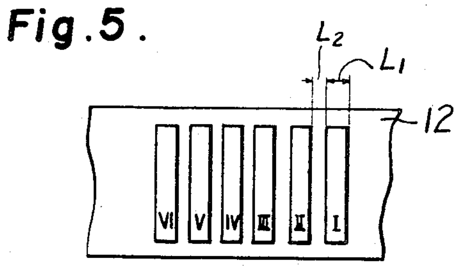
Figure 6A:
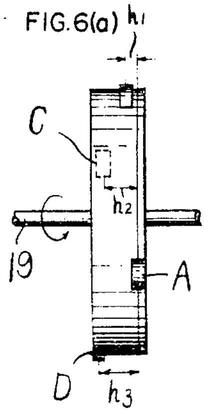
Figure 6B:
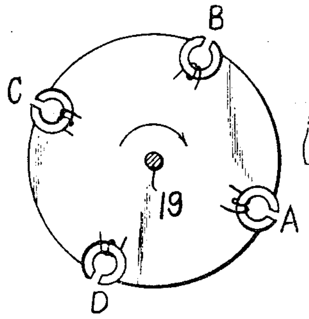
Figure 6C:
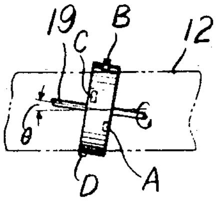
Figure 7:
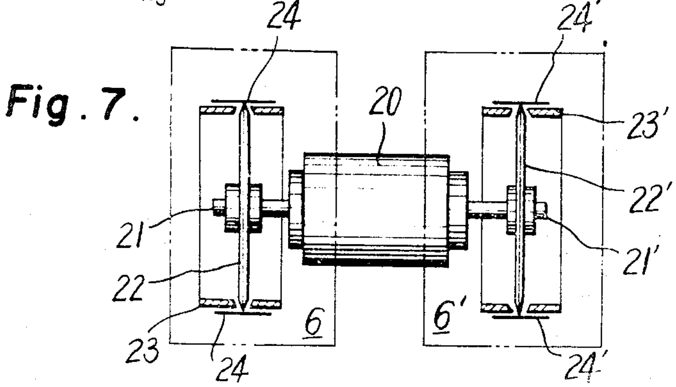
Figures 8A, 8B, 8C:
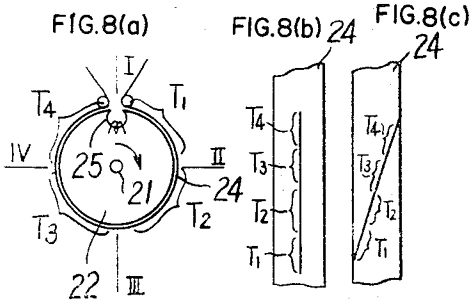
Figure 9A:
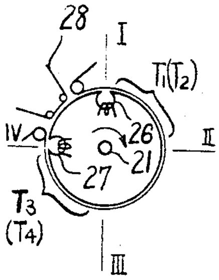
Figure 9B:
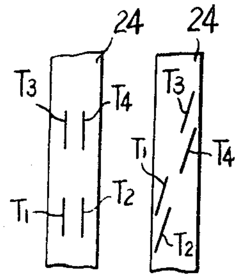
Figure 10A:
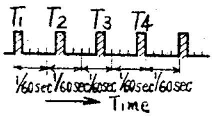
Figure 10B:
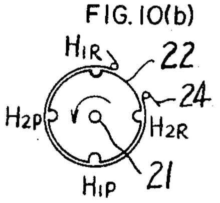
Figure 10C:
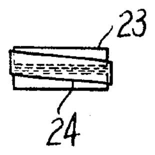
Figure 11:
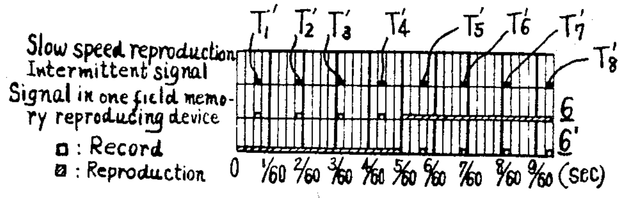
Figures 12, 13:
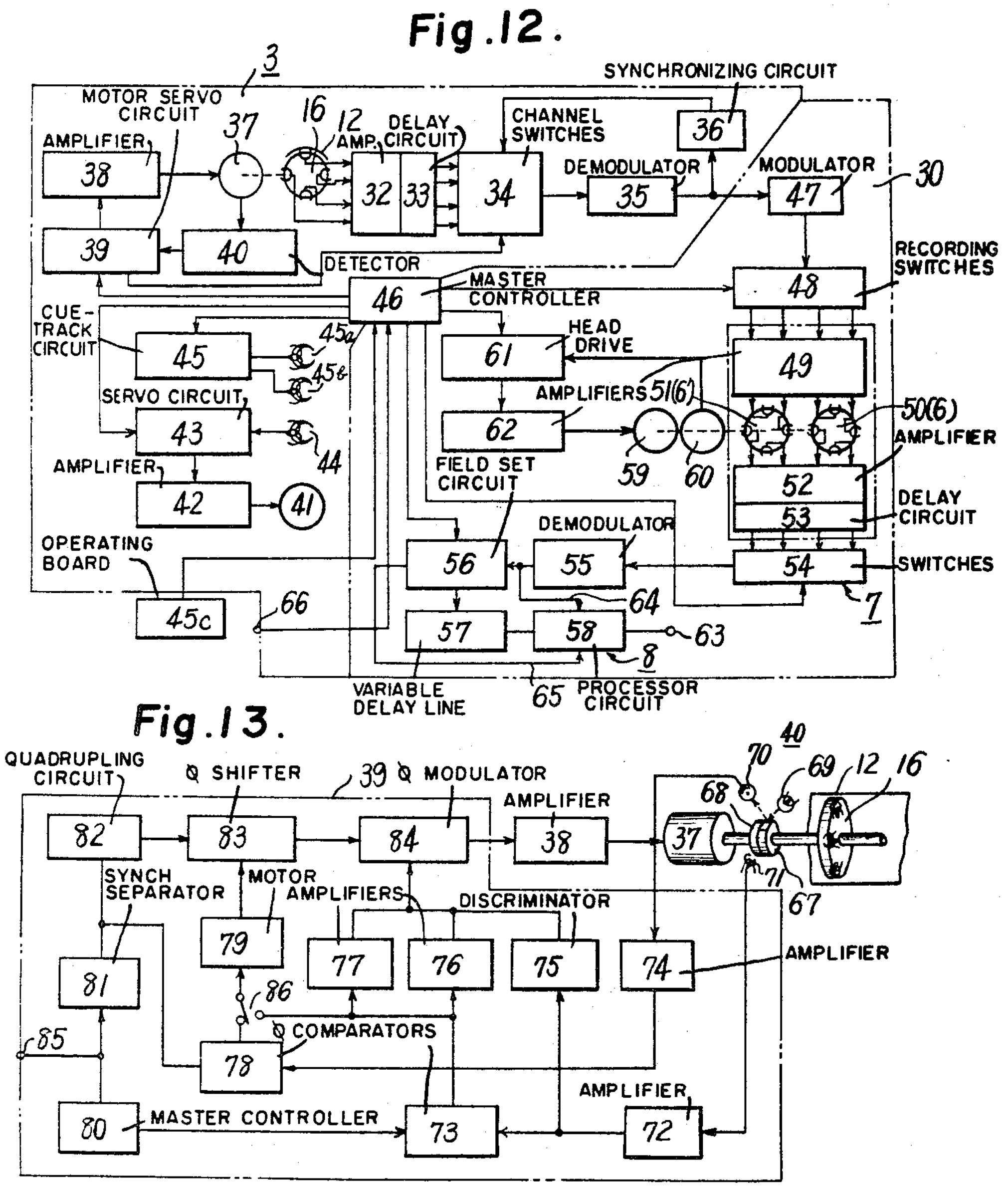

FIG 5 is an enlargement of FIG 4,

FIGS. 6–(*a*), (*b*) and (*c*) are respectively the side view, front view and plan view taken for the explanation of manner of using special assemblies as applied to the above tape slow speed reproducing device embodying the invention in case of a slow motion ratio of 5, FIG. 7 is a front view partly in section of 1-field recording and reproducing device, namely 1-field memory reproducing devices, according to the invention, FIGS. 8–(*a*), (*b*) and (*c*) and FIGS. 9–(*a*), (*b*) and (*c*) are diagrammatic views illustrating the recording track of the device of FIG. 7, FIGS. 10–(*a*), (*b*) and (*c*) are diagrammatic representations of the reproduced signal in the recording reproducing device and the relative relations between the head and tape according to the invention, FIG. 11 is a diagram illustrating the operation of slow motion reproduction according to the invention, FIG. 12 is a block diagram showing the circuit arrangement indicating a slow motioned video tape recorder system according to the invention, and FIG. 13 is a block diagram showing an improved head drum servo system according to the invention.

The corresponding elements in these drawings are indicated with the same reference numerals to facilitate comparison.

FIG. 1 illustrates diagrammatically a system for recording the original standard television signals, like the television signal with interlacing scanning, on the magnetic tape by such video tape recorder as the above and for reproducing it directly as the slow motion or stationary image interlacing scanning television signal, and 1 is an input terminal for the original television signal, 2 is the video tape recorder, 3 is the slow speed tape reproducing equipment to slow down the tape speed, 4 is the gate circuit, 5 is the recording switch, 6 and 6' are 2 sets of 1-field memory and reproducing devices, 7 is the reproducing switch, 8 is a circuit consisting of the field interlacing delay circuit for obtaining the standard television signal with interlacing scanning, demodulation circuit for FM and processor circuit, 9 is an output terminal of the slow motion or stationary image standard television signal, 10 is the switching signal generator, 11 is an input terminal of the gate signal, 11' is an input terminal of switching signal and 11 and 11' are to be connected to the master controller operated by external synchronous signals.

FIG. 2 shows the field sequence diagrams of the field signal of the standard television signal and signals at each point of the slow motion system embodying the invention, and FIG. 2–(*a*) shows the field signal time sequence of the standard television signal, FIG. 2–(*b*) shows the field time sequence of, for example 5 times, slowed down television signals.

FIG. 2–(*c*) is a field time sequence of the slow motion standard television signal which is made by converting the signal in FIG. 2–(*b*) to the television signal with interlacing scanning, FIG. 2–(*d*) is one field intermittently reproduced signal which is the intermittent signal reproduced at the tape slow speed reproducing device and observed at the output side of the gate circuit 4 and FIG. 2–(*e*) is a reproduced signal of one field memorized for the sake of reproducing said intermittent signals as a continuous signal of one field, and $t$ in FIG. 2 represents the time of one field, namely $t=1/60$ sec. The observation points corresponding to FIGS. 2–(*a*), (*b*), (*c*) and (*d*) in the time sequence diagram are indicated as (*a*), (*b*), (*c*) and (*d*) in FIG. 1.

FIG. 3 illustrates an example of a combined arrangement of the above video tape recorder 2 and tape slow speed reproducing device 3, 12 being recording tape, 13 a feed reel, 14 original signal recording head assembly to record the original standard signal on the tape, 15 a tape chamber, 16 the special reproducing head assembly to reproduce intermittently one field original signal recorded on the tape as shown in FIG. 2–(*d*), 17 the tape slow speed driving mechanism, 18 the tape take-up reel, **45*a* is a recording head for cue signals, 45*b* is a reproducing head for cue signals, and 45*c*** is an operating board for ordering start and release of reproducing stationary images.

The operation of the invention is now explained referring to the above embodiment. The standard television signal recorded on the magnetic tape and indicated in FIG. 2–(*a*) is made by frequency modulating a certain carrier frequency wave to facilitate the tape recording and this frequency modulated wave is applied to the original signal recording head assembly 14 of the video tape recorder 2. This video tape recorder 2 is, for example, like a known Ampex type video tape recorder having 4 heads mounted at uniform intervals on the head drum revolving at 240 c./s. perpendicularly to the direction of the width of the 2 inch wide magnetic tape moving at the tape travel speed of 15 inches per second and in contact with the above tape, and recording one field television signal as 16 tracks on the magnetic tape shown in FIG. 4 at a high speed, namely at the relative speed of 1,500 inch/sec. between the tape and head.

FIG. 5 is a partial enlarged view of FIG. 4 to show the recording track width $L_1$ and the track gap $L_2$, $L_1$ being 10 mils, $L_2$ being 5 mils, and the recording tape travels 15 mils while the above recording head drum of the Ampex type video tape recorder turns a quarter of one revolution and one track is recorded. After the original signal has been recorded as FIG. 4 by the above known means, the tape 12 is rewound back to the feed reel 13, and then is drawn to the tape slow speed reproducing device 3 via the tape chamber 15 by means of the tape slow speed driving mechanism 17 as shown in FIG. 3. The tape travel speed at this tape slow speed reproducing device is made one $n$th of the tape travel speed during recording, which corresponds to the slow motion ratio $n$, e.g. $n=5$ and 3 inches per second, and the 16 tracks in FIG. 4 for one field signal are reproduced intermittently during $n$ fields period, e.g. 5 fields period, and thus the one field signal is extended with regard to the time. At this intermittent reproduction, the relative speed between each head of the special reproducing assembly used in the tape slow speed reproducing device 3 and the recording tape is maintained at the same high relative speed with that of recording. FIGS. 6–(*a*) and (*b*) are an example of the special head assembly 16, wherein (*b*) is a front view of (*a*). Since the slope of the tracks recorded on the tape differs a little from the scanning slope with respect to the special reproducing head the special reproducing head assembly is, for example, inclined to a certain extent as indicated in FIG. 6–(*c*) and the head mounting plane is also inclined to result in $\theta=26.5°$ so that the special reproducing head may move right on the tracks indicated in FIG. 4. FIGS. 6–(*a*) and (*b*) are for 4 heads type, namely heads A, B, C and D mounted at uniform intervals on the periphery of the revolving drum, and they are displaced with respect to the head A along the axis of revolution by the distance of $h_1$, $h_2$ and $h_3$. The relation between the slow motion ratio $n$ and $h_1$, $h_2$ and $h_3$ is calculated with reference to the head A as stated above and in the present example it is as follows:

Head A—0
Head B—$15/n$ mils$+h_1=15$ mils
Head C—$30/n$ mils$+h_2=30$ mils
Head D—$45/n$ mils$+h_3=45$ mils Hence, in this example, assuming $n=5$ as indicated in FIG. 2, $h_1=12$ mils, $h_2=24$ mils, $h_3=36$ mils, and each distance in FIG. 6 should be made to have those values.

When the special reproducing assembly 16 having the above 4 heads makes one complete revolution, the four recorded tracks in $T_1$ in FIG. 4 are scanned successively and the $T_1$ in FIG. 2–(*d*) can be reproduced in a spaced relation. The slow down ratio in this example is chosen $n=5$ as stated above, the speed of the recording tape moving nearly perpendicular to each head of the special reproducing head assembly 16 in one $n$th of that for recording, namely 3 inches per second, and in order to reproduce the next four recorded tracks $T_2$ in FIG. 4 the special reproducing head assembly 16 makes four revolutions without reproduction, namely the period corresponding to one field, before the special reproducing heads come into proper relative position for reproduction with the recorded track $T_2$ and then the signal of the recorded track $T_2$ is reproduced as the $T_2$ of FIG. 2–(*d*).

Thereafter, similarly each 4 lines of recorded tracks $T_3$ and $T_4$ in FIG. 4 is intermittently reproduced as $T_3$ and $T_4$ of FIG. 2–(*d*).

Since the signal obtained during the non-productive revolutions of the special reproducing head assembly 16 is, of course, an abnormal and unnecessary signal, the output of the special reproducing head assembly 16 is gated by the gate circuit 4 as indicated in FIG. 1 and only the normal signals $T_1$, $T_2$, $T_3$ and $T_4$ of FIG. 2–(*d*) are selected. Thus the 16 recording tracks for one field indicated in FIG. 4 are divided into 4 groups, as the 4 heads type special reproducing head assembly is used in this example, and are reproduced intermittently over the period of 5 fields as shown in FIG. 2–(*d*). Now, the one field signal reproduced intermittently is fed to either one of the two sets of 1-field memory reproducing device 6 or 6′ through the recording switch 5 of FIG. 1 in order to obtain continuous signal for one field. In FIG. 7, showing an example of it, two sets of head assemblies 22 and 22′ are mounted on the shafts 21 and 21′ of the motor 20 revolving at 60 c./s., and stationary recording media, such as magnetic tapes 24 and 24′ are arranged around the stationary drums 23 and 23′. In the arrangement as shown in FIG. 7, the manner of recording the one field intermittent reproducing signal of FIG. 2–(*d*) is recorded on the 1-field memory reproducing device 6 or 6′ explained above will now be explained. Since the memory devices 6 and 6′ are equivalent, explanation is made for only one of them. FIG. 8–(*a*) indicates the case of recording each of the intermittently reproduced signals $T_1$, $T_2$, $T_3$ and $T_4$ in the said FIG. 2–(*d*) on the stationary recording medium 24 wound one turn around the drum 23 with a head 25 mounted on a head assembly 22 in FIG. 7 and revolved at 60 c./s., the reproducing time of each intermittently reproduced signal, e.g., intermittently reproduced signal $T_1$, corresponds to the period of one revolution of the special reproducing head assembly revolving at 240 c./s., namely $\frac{1}{240}$ second. On the other hand, the head 25 of the 1-field memory reproducing device in FIG. 8–(*a*) revolves at 60 c./s., and if the recording of the intermittently reproduced signal $T_1$ of FIG. 2–(*d*) begins at the head position of FIG. 8–(*a*), the signal $T_1$ is recorded on position $T_1$ corresponding to the first quarter of one revolution as indicated in FIG. 8–(*a*), and the head 25 comes to the position II after a revolution of 90°.

The time elapsed before the next intermittently reproduced signal $T_2$ is applied to the head 25 is $\frac{1}{240}\times4=\frac{1}{60}$ second since the special reproducing head assembly makes four non-productive revolutions. After this period, the head 25 comes again to the position II of FIG. 8–(*a*) after one revolution and the intermittently reproduced signal $T_2$ is recorded on the position $T_2$, the space between II and III of FIG. 8–(*a*).

Thereafter, similarly the intermittently reproduced signals $T_3$ and $T_4$ are recorded on the positions shown in FIG. 8–(*a*), and as a result of it, the intermittently reproduced signals of one field signal intermittently reproduced over the 5 field periods is recorded on the recording medium of either one of 1-field memory device. FIG. 8–(*b*) and (*c*) are expanded illustrating diagram of the said recording track recorded on the recording medium 24, and (b) indicates the case with the stationary recording medium 24 wound around the drum 23 as in FIG. 7, and (*c*) indicates the case with the recording medium 24 helically found around the drum 23.

FIG. 9–(*a*) is another embodiment of the head assembly of 1-field memory reproducing device revolving at 60 c./s. and having respectively two heads 26 and 27 mounted on the head assemblies 22 and 22′ with 90 degree displacement and with a distance in the direction of the axis of the shaft 21, and FIG. 9–(*b*) and (*c*) are enlarged diagrams illustrating recording tracks of this case. In this embodiment, the head switching is performed so that the intermittently reproduced signals $T_1$ and $T_3$ are recorded by the head 26 and $T_2$ and $T_4$ by the head 27 respectively. In this multi-head type, there is no recording medium disposed in the part approximately corresponding to the part I–IV of FIG. 9–(*a*), and the changing of recording medium 24 is made simpler and additional device such as a device for cleaning heads 26 and 27, e.g., the cleaning tape 28 is mounted in the position as shown in FIG. 9–(*a*) and as the result the gaps of heads 26 and 27 are prevented from being stuffed with magnetic powders of the tape 24 or dust particles. FIG. 9–(*b*) indicates the tracks on the tape in the case with the recording medium 24 wound around the drum as in FIG. 7 and FIG. 9–(*c*) indicates those in the case with the recording medium 24 helically wound around the drum.

When the one field intermittently reproduced signals are recorded on one of 1-field memory reproducing device as explained above, e.g. recorded on 6, the recording switch 5 is operated and the next one field intermittently reproduced signals $T_5$, $T_6$, $T_7$ and $T_8$ of FIG. 2–(*d*), only $T_5$ being shown in the drawing, are recorded on the other side 1-field memory reproducing device 6′ in the same way as explained above. Before the recording of $T_5$ in the next one field on the 1-field memory reproducing device 6′ is initiated, the head of the 1-field memory reproducing device 6 is switched to reproducing condition, and the reproducing switch 7 is connected to the 1-field memory reproducing device 6, and five consecutive repetitions of the same field signal as FIG. 2–(*b*) are obtained out of said track with one field recorded in it, namely the reproduction is made by 5 revolutions of the head assembly 22 revolving at 60 c./s. in 1-field memory reproducing assembly and the television signal of 5 times slowed down is obtained. In the embodiments of the invention shown in FIG. 8 and FIG. 9, the heads of two sets of 1-field memory equipment are used both for recording and reproducing, but of course possible is the magnetic recording and reproducing system using single-head or multi-head recording head during recording period for recording the said signal in a certain definite sequence, using single-head or multi-head reproducing head for reproducing the said recorded signal alternately and interchanging said recording and reproducing operation alternately.

As explained in the above embodiment of the invention the recording medium 24 is stationary and the new signal is recorded on the track of the old signal, and is was found harmless for all practical purposes not to provide there any demagnetizing head for demagnetizing the old signal and to record to new signal over the old signal. The slow motion signal in FIG. 2–(*b*) is *n* times simple repetition of the same field in FIG. 2–(*a*) and the adjustment in its horizontal synchronizing period for interlacing scanning is necessary, and said signal is converted by passing through the circuit 8 in FIG. 1 including a field interlacing scanning delay circuit, F.M. demodulator, processor circuit, etc., into standard television signal wave form with interlacing scanning as shown in FIG. 2–(*c*) for feeding the output terminal 9 in FIG. 1.

Referring to FIG. 10 to FIG. 12 the operating principles of the slow motioned reproduction is explained in detail hereafter. At first, the tape with the standard television signal recorded on it by said 4 head type video tape recorder is run for reproduction at $\frac{1}{5}$ of the normal tape speed as explained before, and by using a special reproducing head assembly one field signal of it is divided into 4 equal divisions over the period of 5 fields as explained before and intermittent reproduction of one field signal on the tape over the period of $\frac{5}{60}$ second can be done as shown in FIG. 10–(*a*).

On the other hand, the above intermittently reproduced signals are recorded successively on the 1-field memory device prepared separately, and when recording of one field is completed, the above signal is reproduced 5 times consecutively and 5 times slowed down signal is obtained. The 1-field memory reproducing devices used for this purpose consists of two units 6 and 6′ having said construction wherein heads mounted on revolving discs slide in contact with the inside surface of magnetic tapes 24 wound around cylinders 23 as shown in FIG. 10–(*b*) and (*c*). On each of the revolving discs 22 and 22', a pair of heads consisting of one of recording heads $H_{1R}$ and $H_{2R}$ and one of reproducing heads $H_{1P}$ and $H_{2P}$ respectively are so mounted as to produce recording tracks as shown in FIG. 9–(*c*) and reproduce them, and the two revolving discs 22 and 22' are rotated at 60 revolutions per second continuously. When the 1-field memory device is operated, unit 6 of said memory reproducing device may record the intermittently reproduced signals $T_1$, $T_2$, $T_3$ and $T_4$ shown in FIG. 11 on its recording medium as shown in FIG. 9–(*c*) and the other memory reproducing unit 6' may reproduce the preceding field signal while said unit 6 records the intermittent signals, namely referring to FIG. 11 the signal $T_1'$ may be reproduced by the head $H_{1P}$ the signal $T_4'$ by the head $H_{2P}$ respectively for $1/240$ second successively, and thus a complete field signal may be obtained and may be repeated 5 times. Since the said recordiing and reproducing operation can be done respectively in the period of 5 fields, in the following 5 fields period the function of the 1-field memory reproducing device units 6 and 6' is switched immediately to use the unit 6 for reproduction and 6' for recording the next one field, namely the intermittently reproduced signals $T_5$, $T_6$, $T_7$ and $T_8$ as shown in FIG. 11, and the slow motion reproduction may be done by having those operate alternately.

A stationary image can be obtained by stopping the original picture tape and by reproducing continously from one side of the 1-field memory reproducing devices, and the transfer from the stationary image to slow motion is done by resuming the movement of the original picture tape and recording the next field on the 1-field memory reproducing devices not used for the stationary image and repeating said process.

FIG. 12 illustrates details of the slow motion circuit consisting of the slow speed tape reproducing equipment 3 and the circuit 30 including the 1-field memory reproducing devices of the embodiment shown in FIG. 3, except the magnetic tape recording device 2 for the original television signal.

The portion 3 enclosed by dotted lines represents the slow speed tape reproducing equipment passing the magnetic tape 12 with the original television signal recorded therein at a speed of 3 inches/sec. to provide intermittently reproduced signals, and the tape delivery mechanism is the same with that shown in FIG. 3 and the original signal for one field is reproduced from tape 12 by means of the said special reproducing head assembly 16. The output of this reproducing head assembly 16 is fed to reproducing amplifier 32 and amplified thereby. In the next 90 degree equalizer 33, the time adjustment is made for said intermittently reproduced signals and as a result each time deviation of said intermittent signals of the one field reproduced by the 4 heads on the special reproducing assembly 16 can be eliminated, and the output of 33 is fed to the next 4 channel switches 34, and the output of each channel is connected successively at proper intervals to provide a continuous intermittently reproduced signals (see $T_1$, $T_2$, $T_3$ and $T_4$ in FIG. 11). This intermittently reproduced signal, namely one field divided into four parts, is fed to the demodulator 35 and the said divided television signal is demodulated. A part of the output of 35 is fed to the modulator 47 and the other part of the output is fed to the 4 channel switches 34 via a synchronizing circuit 36 as a feed back and makes timing of the channel switching. The output of the modulator 47 is fed to memory side of either one of 1-field memory reproducing devices 50 and 51 for recording at suitable intervals set by switching via recording switches 48 and recording amplifier 49, and the switching is made with the period so chosen to enable recording on one of the circuits 50 and 51 while reproducing on the other one of them. The period of this switching operation is as explained with reference to FIG. 11. The output of either one of reproducing circuits, e.g. the output of 50, is fed to the reproduction amplifier 52 and 90 degree equalizer 53 to be amplified and adjusted with respect to the time of the intermittently reproduced signal of each channel, and then fed to the reproduction switches 54 where the intermittently reproduced signal of each channel is made into a continuously reproduced signal with a corrected time scale. This continuously reproduced signal is fed to the demodulator 55 and demodulated and 5 times continuation of the same signal over 5 fields is attained. Since those demodulated signals are made by 5 times reproduction of the original signal for one field, adjustment is necessary in the horizontal synchronizing period for interlacing scanning. For this purpose, the horizotal synchronizing period *h* is delayed by a half of it in the following field setter circuit 56 and the horizontal synchronizing signal is made continuous. For example, in case of the television standard system having 525 scanning lines per frame having two fields, there are 262.5 horizontal synchronizing signals with regard to a first field and the first field has an odd half period of horizontal synchronizing signal, and hence the next reproduced field signal is delayed by one half of the horizontal synchronizing signal to obtain a frame of a complete standard television signal with a continuous horizontal synchronizing signal.

The said switching operation of the field setter circuit 56 sends out $F_{11}$, $F_{13}$ and $F_{15}$ in FIG. 2–(*b*) without passing $h/2$ delaying circuit, sending out $F_{12}$ and $F_{14}$ after passing $h/2$ delaying circuit, similarly succeeding fields $F_{22}$, $F_{24}$ and $F_{31}$ without passing $h/2$ delaying circuit and $F_{21}$, $F_{23}$ and $F_{25}$ are also delayed by $h/2$ to provide a continuous image signal of frames. Thus the signal obtained from the field setter circuit 56 is fed to variable delaying line 57 to make adjustment on the discontinuities produced at the junction of every four tracks due to the jitter at the said special reproducing head assembly 16 and jitters at 1-field memory reproducing devices 50 and 51 or on the discontinuities between the junction of each intermittently reproduced signal $T_1$, $T_2$, $T_3$ and $T_4$ (see FIG. 2–(*e*)).

The output of this variable delaying circuit 57 is fed to the next processor circuit 58 and image signal formation and adjustment in the vertical synchronism is made in 58. This vertical synchronizing signals adjustment is to adjust the delay in vertical synchronism in the signal delayed by $h/2$ at the field setter circuit 56 and the non-delayed vertical synchronism signal fed from the line 64 is used instead of the vertical synchronism signal in the field delayed by $h/2$ of the output from 57 by the instruction from the line 65. Thus the slow motion standard television image signal with the image renewal every 5 fields is fed to the terminal 63. The special reproduction head motor 37 is mounted on the special reproduction heads assembly 16 to facilitate the said operation and the magnetic wheel detector 40 is mounted on the shaft of the motor 37 to detect the fluctuation in the revolution for feeding it to the head motor servo circuit 39 and thus the motor driving amplifier 38 is automatically controlled in accordance with the fluctuation in the revolving speed and the revolution of the reproducing head motor 37 is automatically controlled at a constant speed. The capstan motor is indicated by 41, 42 is the capstan motor driving amplifier, 43 is the capstan servo circuit, 44 is control track head and those equipments form the system controlling the movement of the tape 12, and by regulating them the tape speed is set at one fifth of that for recording, and the tracking operation is done in this part to let each head of the special reproducing heads assembly 16 in FIG. 4 trace the record track exactly for intermittent reproducing. The cue track heads are indicated by 45*a* and 45*b*, and 45 is the special cue-tracking circuit to be used for controlling the tape movement during the reproducing of the instantaneous stationary image. The motor to rotate the heads of the 1-field memory reproducing circuit 50 and 51 is indicated by 59, 60 is the magnetic wheel detector mounted on the shaft of the motor, 61 is the head driving motor servo circuit, 62 is an amplifier for driving the motor, and these equipments are effective to control the revolution of the head of the 1-field memory reproducing circuits to exactly constant speed. Hence it is sufficient to use similar construction here to that explained with regard to the magnetic wheel detector 40. 46 designates a master controller which provides the signal to control mutual relations between each switching circuit and driving circuit based on the external synchronizing signal fed from the input terminal 66 of external synchronism, and the said signal is delivered to each part as the general control signal from the general control device. It is a very important condition to keep the revolution of said head motors 37 and 59 at the constant speed, and the one of its practical examples is shown in FIG. 13.

In FIG. 13, 16 is the special reproducing head assembly, 37 is the motor for reproducing head, 38 is a driving amplifier, 39 is a servo circuit for the reproducing motor in FIG. 12 and 40 is a combination consisting of a tone wheel detector, a part of a PEC ring 67 marked with black and white divisions, a magnetic recording belt 68 mounted on a part of the PEC ring surface, a magnetic head 71 placed close to the PEC ring, a lamp 69 mounted close to the PEC ring, and a photo electric converter 70 like a photo transistor.

For instance, when the reproducing head motor 37 is revolving at 240 c./s., the tone wheel detector 40 including the PEC ring mounted on its shaft starts revolving and the light projected by the lamp 69 is reflected by the PEC ring 67 and the reflected light is converted to electrical signals with the photo-electric converter 70 after reaching there, and its output is fed to the amplifier 74 to be amplified. On the other hand, 525 pulses are magnetically recorded on the said magnetic recording belt 68 at uniform intervals and 525 pulses are so disposed as to be reproduced per one revolution by the magnetic head 71, and the reproduced signal is fed to the magnetic wheel amplifier 72. The amplifier amplifies the output of the magnetic head while reducing its frequency to ⅛ and one of its outputs is fed to the discriminator 75 and thus a voltage proportional to speed fluctuation of motor 37 is obtained. The other hand, the output is fed to the horizontal phase comparator 73 which detects the phase difference between the standard horizontal synchronizing signal obtained by means of the horizontal synchronizing signal separator supplied through the master controller 80 is detected and said output, and its error voltage are taken out and fed back to the phase modulator 84 through the compensating amplifier 76 and the D.C. amplifier 77 and together with the output of the discriminator 75, and thus the revolving speed of the reproducing motor 37 is automatically controlled to be always constant via the driving amplifier 38. The output of the PEC amplifier 74 is fed to the vertical phase comparator 78 and there its phase difference is detected in comparison with the vertical synchronizing signal taken out of the synchronizing signal fed to the terminal 85 by the master controller 80 via vertical synchronizing signal separator 81, and said phase difference drives the balancing motor 79 via the switch 86, and the resolver phase shifter 83 directly mounted on the shaft of said motor shifts phase of 240 c./s. signal which is output of the quadrupling circuit 82 quadrupling output of the vertical synchronizing signal separator 81, and the phase modulator 84 applies phase modulation on output of the resolver 83 with the output of the said circuits 75, 76 and 77 and thus the reproducing motor 37 is controlled by output of 38.

The purpose for providing the switch 86 is to control the resolver phase shifter 83 at the time of starting by the standard synchronizing signal fed from the master control via the terminal 85 for driving the head motor 37 and the signal from the vertical phase comparator 78 to control the phase during the revolution of the reproducing head motor 37, but once the phase becomes stable near the anticipated value the switch is to be turned to the output of the horizontal phase comparator 73 to carry out finer phase control via the phase shifter 83.

In a conventional Ampex type video tape recorder the detection of revolving speed or the revolving phase of the head motor shaft is made by 240 c./s. pulses or 1 pulse per 1 revolution and as a result of it the detecting time was long and the quick fluctuation occurring during one revolution was difficult to detect. Besides in the process, for example, Ampex type Inter-Sync, to adjust the jitter during the reproduction there appears much jitter in recording and the additional quantity increases and the jitter has not been made sufficiently small, but in the method of said practical application such disadvantage can be eliminated.

The advantage of remodulating the intermittently reproduced signals after being demodulated as in FIG. 12 is the fact that the relative speed between the tape 24 and heads for recording and reproducing the 1-field memory reproducing devices can be made larger than the relative speed between the original tape 12 and the head in the recording and reproducing system and hence the frequency modulation of the 1-field memory reproducing devices is possibly made in different manners from that used in the process of recording on the original tape 12 and thus the signal to noise ratio S/N and the frequency characteristics can be improved in the 1-field memory reproducing device.

Referring to the cue-track head **45*a* and 45*b* and the cue-tracking circuit 45 illustrated in FIG. 12 the method of reproducing instant stationary images is now explained. When the signal instructing for reproduction of instant stationary image reaches from the operating board 45*c* (cf. FIG. 3) to the master controller 46 of the equipment in FIG. 12 the cue signal produced beforehand by the cue-tracking circuit 45 during recording is recorded on the cue-track 45*d* (cf. FIG. 4) of the original tape 12 by the cue-head 45*a* and at the same time the switching of the 1-field memory reproducing devices 50 and 51 (correspond with 6 and 6′** of FIG. 7–(*a*)) is stopped to reproduce signals only from either one of the said devices and a continuous same image is reproduced through the reproduction switches 54 switching operation of which is stopped now. When the recording of the cue-track signal to be recorded is completed a certain length (e.g. 15 inches) of the tape is counterwound and the cue signal previously recorded is reproduced by the cue-head **45*b* and hence the tape movement is automatically stopped by the said cue signal and the tape is awaiting in that state until the next signal iss applied to the operating board 45 by an operator instructing to shift from stationary image reproducing operation to slow motion reproduction operation. Then as the operator applies the instruction to the operating board 45*c* ordering shift to slow motion operation the tape starts moving again at a slow speed (e.g. 3 inch/sec.) and the recorded track of said tape 12 is followed by said special reproducing heads in order to obtain intermittently reproduced signals, and as the cue signal previously recorded on the cue-track is reproduced by the cue-head 45*a* either one of 1-field memory reproducing devices 50 or 51 is started again to be recorded with said intermittently reproduced signals and when the intermittently reproduced field following the field, namely the field of stationary image, previously being continuously reproduced is recorded the switching operation of the reproduction switches 54** is again started and the initial slow motion image reproducing operation comes back.

The characteristic of the system according to this invention is first of all, attaining slow motion image out of the standard television signal. A principal advantage is that this system not only requires neither special cameras nor special instruments but also suffices to use the conventional video tape recorder directly. Namely, use of 4 heads video tape recorder is advantageous in handling, operation, maintenance, interchangeability, etc., and in addition the tape recorded under the standard condition can be applied directly to the reproduction of slow motion image, and the exclusive slow motion equipment being unnecessary, the equipment also can be used as it is for general recording and reproducing operation, and thus it greatly contributes to the use of the video tape recorder for making television programs.

The second advantage is that the slow motion reproduction being possible in a very short time after the completion of recording the effects of broadcast production is improved.

Besides, as the signal recorded on the magnetic tape of the video tape recorder is directly reproduced, the system according to the invention has advantages which are impossible in the conventional system using films, for instance, good quality in the image and easiness in handling compared with conventional method of reproduction using films.

It was disclosed in said embodiment that instead of using the tape chamber 15 the standard television signals were recorded on the tape 12 which was once wound back to the feed reel 13 to reproduce the recorded signals intermittently therefrom at the tape slow speed reproducing device 3. It is of course possible by the use of the tape chamber 15 to record the standard television signals on the tape 12 at the video tape recorder 2 while reproducing the signals intermittently at the tape slow speed reproducing device 3.

Assumptions were made in said embodiment that the frequency of television field signals was 60 c./s. and the number of recording tracks per field in said conventional 4 heads video tape recorder was 16, and hence the number of divisions was automatically determined for the uniform division of said recording tracks for the sake of intermittent reproduction. With the field signal frequency of 50 c./s., the conventional number of recording tracks in said 4 heads video tape recorder is 20 tracks per field, and the number of uniform division of said recording tracks should be properly selected accordingly. As for the slow down ratio, however, the test results on the eyesight indicate that the slow down ratio of $n=5$ as used in the preceding description gives most favourable effects.

As explained above, according to this invention, the original signal can be instantly converted to a slow motion signal by combining with the conventional video tape recorder, and the stationary image reproduction is made very simple by repeatedly reproducing for an arbitrary period the one field signal recorded in the 1-field memory reproducing device, and in addition the video tape previously recorded can be reproduced as the slow motion signal, and thus this invention contributes greatly to the industry and especially if it is applied to the television broadcast programs as sports broadcasting the production effects will be greatly improved.

What we claim is:

1. A recording and reproducing system for television signals which comprises reproducing means for moving a recording medium containing recorded television signals at a reduced speed of $1/n$ where $n$ is a positive integer, means for recording one-field as multiple line tracks on the recording medium, means for intermittently reproducing the original signal of said one-field by dividing said one-field into an integral number of groups, each group having equal number of tracks and with an equal time interval between each adjacent group over the period of $n$-fields, means for recording each said group of one-field intermittently, means for continuously reproducing said intermittently recorded signal as one-field, means for alternately operating said last mentioned intermittently recorded signal, and continuously reproducing means to reproduce slow motion picture signals at $1/n$th rate of normal picture speed.

2. A recording and reproducing system for television signals according to claim 1, further comprising a head drum having four heads, and being in operative relation with the means for intermittently reproducing from the original signal of one-field record a number of tracks on said magnetic medium which passes around the head drum which is revolving at frequencies of an integral multiple of the number of fields of the television signal which fields are at an equi-distance and shifted with each other toward the direction of the revolving shaft, means for reproducing first one-field equally divided signals continuously from the first group of equally divided recording tracks of said one-field signals, means for reproducing second one-field equally divided signals from the second group of the equally divided recording tracks after said first group has been reproduced, and said head drum being freely rotatable to create a lapse of field time of $n-1$/divided number, where $n$ is a positive integer and slow ratio between the adjacent groups, and means for reproducing one-field equally divided signals intermittently over $n$-field periods from a plurality of lines of recording tracks of one-field signals by repeating successively and continuously said reproducing means.

3. A recording and reproducing system for television signals according to claim 1, wherein said recording and reproducing device comprises two sets, each having one head-drum rotating at a revolving speed equal to the number of fields and also two heads for recording and reproducing and provided with means for applying, in case of recording, said one-field equally divided reproduced signals to one of said field recording and reproducing means over the $n$-field period, first switch circuit means for changing over said one-field equally divided reproduced signals each $n$-field period, means for applying the first one of each equally divided reproduced signals of said one-field to one of the heads to record on a stationary recording medium provided for one of said field recording and reproducing devices, means for changing over to apply the second equally divided reproducing signals to the other recording heads secured to said head drum after the first equally divided reproduced signals have been recorded on said one of the recording heads, means for applying each of the equally divided reproducing signals of the next one-field through said first switch circuit to the other field recording and reproducing device after each of the equally divided reproducing signals over $n$-field has been recorded by each of said means, means for changing over one of said field record reproducing devices which has recorded one-field equally divided reproduced signals to the reproduced condition, means for reproducing one-field track over $n$-field periods continuously after changing over each of said heads according to the recording sequences and means for applying the reproduced signals over said $n$-field period to the second switch circuit for changing over the output of said two field recording and reproducing devices in each of $n$-field recording and reproducing devices in each of $n$-field period, thereby delivering continuous television signals to the output terminal.

4. A recording and reproducing system for television signals according to claim 1, in which slow motion television signals of $n$-times are obtained by dividing the original signals of said one-field into four groups wherein said field recording and reproducing device comprises two head drums secured to a revolving shaft having the same number of revolutions as the number of fields of television signals, each of said head drums being mounted thereon at the ¼ section around the periphery of said shaft at axially offset positions, two sets of recording heads respectively being provided with two sets of reproducing heads for scanning the track recorded by each of said recording heads and arranged symmetrically to the shaft in each of said sections, and a recording medium wound helically around the periphery of each said head drum, and a cleaning device mounted out of contact with said recording medium and adapted to sweep the tip of each said head.

5. A recording and reproducing apparatus for producing slow motion and stop action television signals comprising a head drum rotatable at a revolving frequency of an integral multiple of the number of fields of the television signals, a plurality of heads arranged at equidistance around the periphery of said drum, a recording tape on which are magnetically recorded signals produced by FM modulation of the carrier wave with said television signals by scanning withh said heads said tape in the direction of its width for recording one-field signal in the form of a plurality of line tracks in the width direction of said recording tape, means for driving said recording tape at 1/*n*th recording speed in order to reproduce slow motion image reproducing signals from said recording tape, means for intermittently reproducing said plurality of recording tracks for the one-field signals equally divided in time over *n*-field periods, means for effecting time compensation so as to connect said equally divided reproduced FM signals, at least two magnetically recording and reproducing means each having at least one head-drum rotating at a number of revolutions equal to the number of fields of said television signals for making said time compensated one-field equally divided reproduced FM signals a continuous television signal over the *n*-field duration, each of said magnetically recording and reproducing means being provided with means for recording and reproducing so as to record said divided and reproduced FM signals of said one-field over said *n*-field periods successively and intermittently and then continuously reproduce said field signals, means for alternately switching over said recording and reproducing means for each *n*-field period, means for compensating time deviation caused by changing said FM signals to a continuous signal for *n*-fields by means of each of said recording and reproducing means, means for demodulating said continuous FM television signals, means for compensating the horizontal synchronizing period to interlaced scanning said demodulated signals at each field, thereby providing *n*-fold slow motion television signals from tape recorded television signals.

6. A recording and reproducing system for television signals according to claim 5, which comprises a head drum having four heads arranged with the device for intermittently reproducing from the original signal of one-field record as a number of tracks of a magnetic medium arranged around the head drum revolving at frequencies of integral multiple of the number of fields of the television signal at an equidistance and shifted with each other toward the direction of the revolving shaft, means for reproducing the first one-field equally divided signals continuously from the first group of equally divided recording tracks of a plurality line of recording track of said one-field signals, means for reproducing the second one-field equally divided signal from the second group of the equally divided recording tracks after said first group has been reproduced and said head drum being freely rotatably to create a lapse of field time of *n*–1/divided number, where *n* is a positive integer and slow ratio between the adjacent groups, and means for reproducing one-field equally divided signals intermittently over *n*-field period from a plurality line of recording tracks of one-field signals by repeating successively and continuously said reproducing means.

7. A recording and reproducing apparatus according to claim 5 wherein said recording and reproducing means each comprise said one head-drum rotating at a revolving speed equal to the number of fields and also two heads for recording and reproducing and provided with means for applying, in case of recording, said- one-field equally divided reproduced signals to one of said field recording and reproducing means over the *n*-field period, first switch circuit means for changing over said one-field equally divided reproduced signals each *n*-field period, means for applying the first one of each said equally divided reproduced signals of said one-field to one of the heads to record on a stationary recording medium provided for one of said field recording and reproducing means, means for changing over to apply the second equally divided reproducing signals to the other recording heads secured to said head drum after the first equally divided reproduced signals have been recorded on said one of the recording heads, means for applying each of the equally divided reproducing signals of the next one-field through said first switch circuit to the other field recording and reproducing means after each of the equally divided reproducing signals over *n*-field has been recorded by each of said means, means for changing over one of said field record reproducing means which has recorded one-field equally divided reproduced signals to a reproducing condition, means for reproducing one-field track over *n*-field periods continuously after changing over each of said heads according to the recording sequences, or second switch circuit, and means for applying the reproduced signals over said *n*-field periods to said second switch circuit for changing over the output of said two field recording and reproducing means in each of *n*-field periods thereby delivering continuous television signals to an output terminal.

8. A recording and reproducing apparatus according to claim 7, wherein each said head drum is provided with two recording heads and two reproducing heads so arranged that each equally divided reproducing signals in one-field reproduced during *n*-field period are recorded by said recording heads and thereafter the head drum is turned one half revolution to start reproduction.

9. A recording and reproducing apparatus according to claim 5, said field recording and reproducing means each comprise two head drums secured to a shaft revolving at the same number of revolutions as the number of fields of television signals, each of said head drums being mounted at the ¼ section around the periphery of said shaft at axially offset positions, two sets of recording heads respectively being provided with two sets of reproducing heads for scanning the track recorded by each of said recording heads and arranged symmetrically to the shaft in each of said sections, and a recording medium wound helically around the periphery of each said head drum, and a cleaning device mounted out of contact with said recording medium and adapted to sweep the tip of each said head.

References Cited

UNITED STATES PATENTS

| | | | |
|---|---|---|---|
| 3,170,031 | 2/1965 | Okamura | 178—6.6 |
| 3,283,068 | 11/1966 | Urrey | 178—6.6 |

ROBERT L. GRIFFIN, *Primary Examiner.*

H. BRITTON, *Assistant Examiner.*